United States Patent [19]

Stankosky et al.

[11] Patent Number: 5,057,139
[45] Date of Patent: Oct. 15, 1991

[54] PLUNGER MECHANISM FOR I.S. MACHINE WITH THERMALLY ISOLATED CONDUITS

[75] Inventors: Michael J. Stankosky; Vaughan Abbott, both of Hartford; Albert J. Trahan, Tolland, all of Conn.

[73] Assignee: Emhart Industries, Inc., Towson, Md.

[21] Appl. No.: 619,075

[22] Filed: Nov. 28, 1990

[51] Int. Cl.⁵ .............................................. C03B 11/12
[52] U.S. Cl. ........................................ 65/319; 65/356
[58] Field of Search ................. 65/172, 173, 355, 356, 65/319, 322, 362, 323

[56] References Cited

U.S. PATENT DOCUMENTS

| | | | |
|---|---|---|---|
| 3,178,276 | 4/1965 | Kawecka et al. | 65/356 |
| 3,997,318 | 12/1976 | Takatoki et al. | 65/356 |
| 4,272,273 | 6/1981 | Trahan et al. | 65/319 |

Primary Examiner—Richard V. Fisher
Assistant Examiner—John Hoffmann
Attorney, Agent, or Firm—Spencer T. Smith

[57] ABSTRACT

A plunger mechanism assembly where cooling air to and hot exhaust air from the plunger passes through the base plate which supports the mechanism. The hot and cool air is horizontally separated in a laminated base and insulated one from the other by a plate of heat resistant material.

2 Claims, 3 Drawing Sheets

PLUNGER MECHANISM FOR I.S. MACHINE WITH THERMALLY ISOLATED CONDUITS

In the press and blow process carried out in an individual section of an I.S. machine, a plunger which is a part of a plunger mechanism is forced into a gob of molten glass contained within a blank mold to form a parison and the parison is then transferred to a finish mold where it is blown into a bottle or the like.

Cooling air is supplied to the interior of the plunger and the hot air exhausted from the plunger is passed through the lower cylinder portion of the plunger mechanism through the base plate exhaust cavity and into the foot which supports the plunger mechanism.

A conventional solution to this problem is to vent the exhaust into the frame without passing it through the lower cylinder portion but this solution has some undesirable side effects.

It is accordingly an object of the present invention to vent the exhaust through the lower cylinder portion without heating it up.

Other objects and advantages of the present invention will become apparent from the following portion of this specification and from the accompanying drawings which illustrates in accordance with the mandate of the patent statutes a presently preferred embodiment incorporating the principles of the invention.

Figure 1:
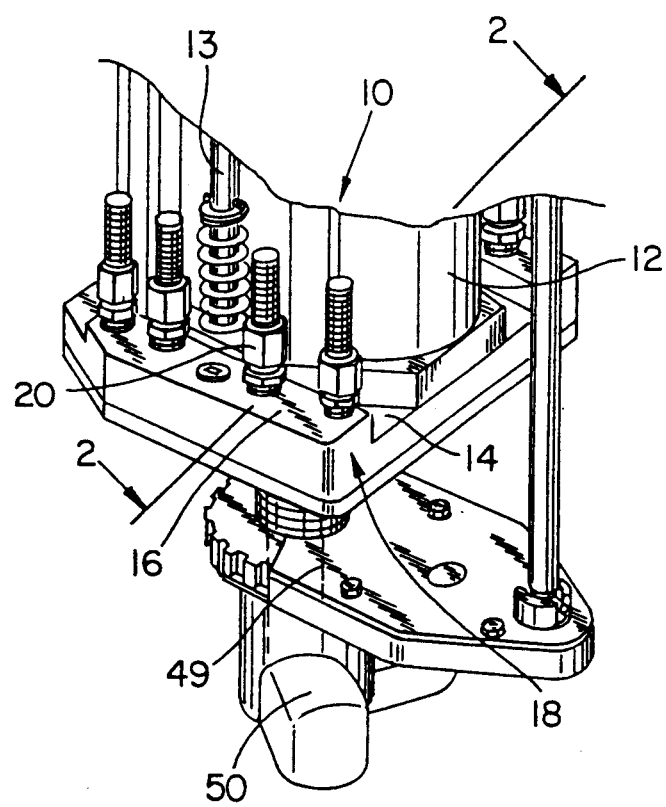
Figure 2:
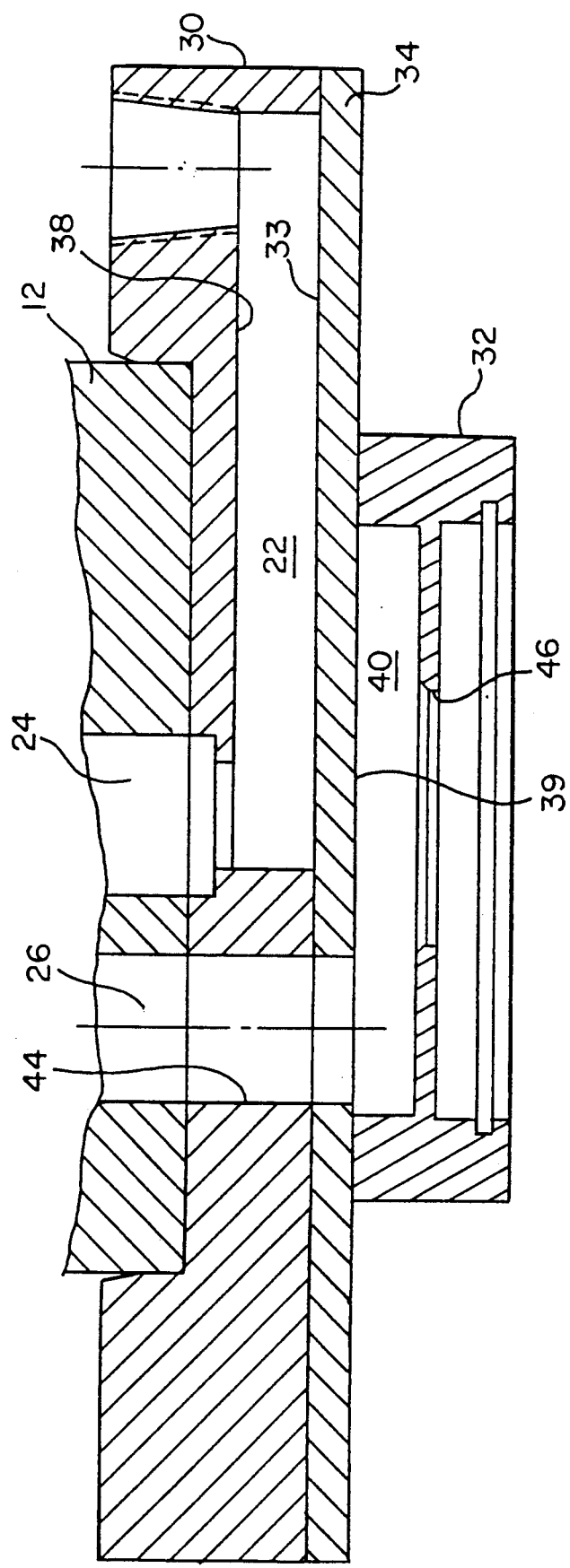
Figure 3:
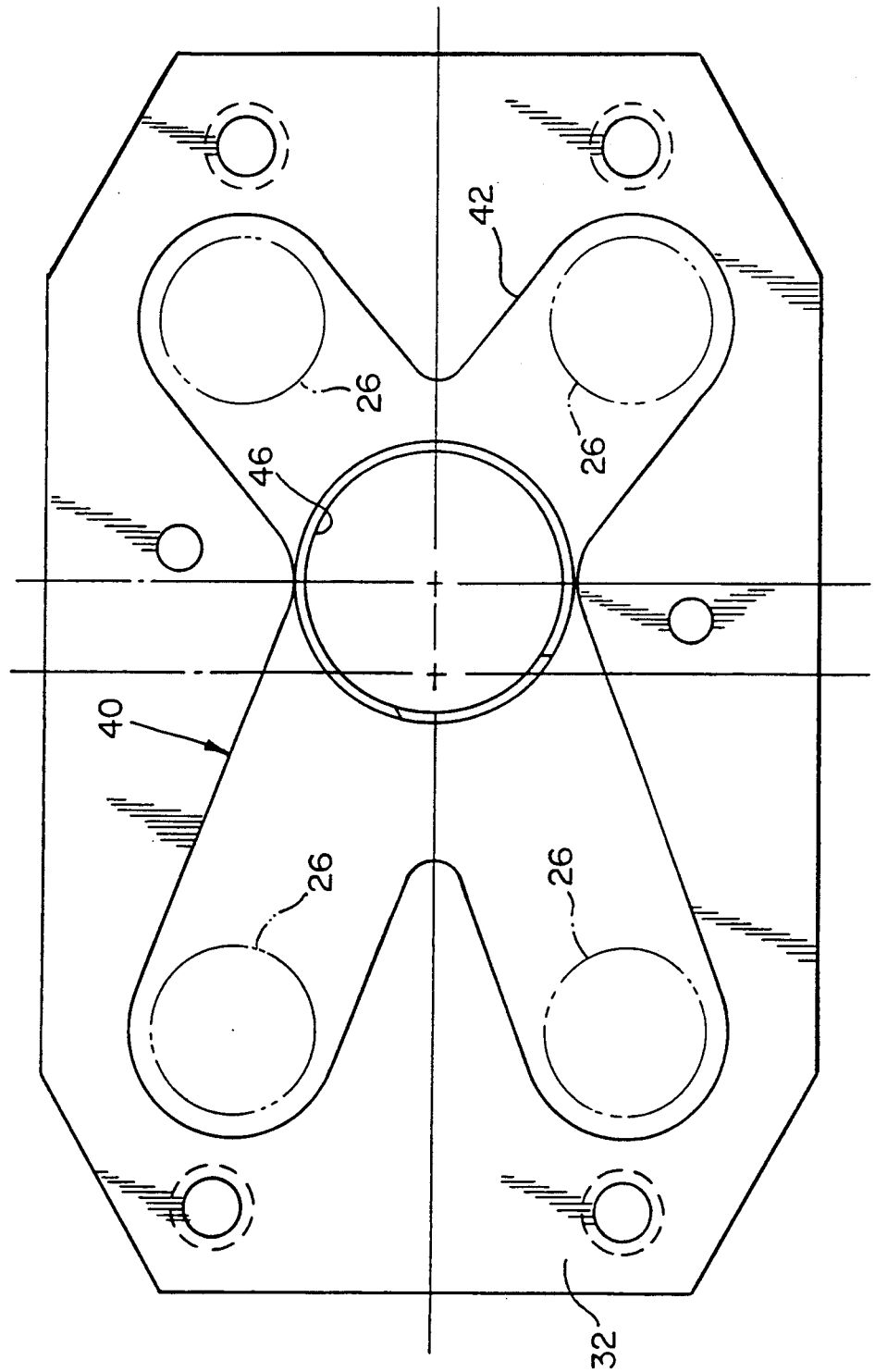

Referring the drawings:

FIG. 1 is an oblique view of a portion of a plunger mechanism vertically separated from the plunger foot; and FIG. 2 is a cross-sectional view of the plunger mechanism base taken at 2—2 of FIG. 1; and FIG. 3 is a top view of the lower base plate shown in FIG. 2.

The plunger mechanism 10 has a lower cylinder portion 12 which is secured by tie rods 13 (only one shown) to the recessed portion 14 of the top surface 16 of the base plate assembly 18. Also connected to the top surface 16 is plunger piping 20 which supplies cooling air to the plunger mechanism via cooling air passages 22 (FIG. 2) within the base plate assembly. Cooling air will pass through conduits 24 in the plunger mechanism to the plungers (not shown) and hot air exhausted from the plungers will be directed through exhaust conduits 26 in the plunger mechanism. The location of the exhaust conduits (here four, for a triple gob configuration) relative to the lower base plate is shown in dotted lines in FIG. 3.

The base plate assembly is made up of upper 30 and lower 32 base plates made from cast iron which effectively conducts heat and an intermediate base plate 34 made from heat resistant material such as stainless steel which acts as an insulator. The upper surface 33 of the intermediate plate 34 forms the cooling air conduit 22 with a channel 38 defined in the bottom of the upper plate 30 and the lower surface 39 of the intermediate plate forms an exhaust cavity 40 with an "X" shaped cut out 42 (FIG. 3) in the top of the lower plate 32. A through hole 44 extending through the upper and intermediate plates connects each exhaust conduit to the associated end portion of the "X" shaped cut out 42. The "X" shaped cut out 42 is configured to minimize turbulence and hence to speed up flow through the base plate assembly thereby minimizing heat transfer at the through hole 44 to the upper plate 30. The exhaust cavity communicates, via an opening 46 in the bottom of the lower plate, with an air conduit 49 in the foot 50 which supports the base plate assembly.

We claim:

1. A plunger mechanism assembly comprising
   a plunger mechanism including three lower cylinder means for supporting plungers for selected displacement, each of said lower cylinder means having a cooling air conduit for delivering cooling air to the plunger and an exhaust conduit for exhausting hot air discharged from the plunger,
   base plate means including
   a lower plate having a bottom opening and an exhaust cavity including a plurality of horizontal conduits for directing hot exhaust air from locations horizontally spaced from said bottom opening to said bottom opening,
   an upper plate having a plurality of top openings and cooling air conduit means for directing cooling air from a location horizontally spaced from said top openings to said top openings and
   an intermediate plate of heat resistant material intermediate said upper and lower plates for insulating said upper plate from said lower plate, and
   through hole means defined in said upper and intermediate plates interconnecting said exhaust cavity and said exhaust conduits.

2. A plunger mechanism according to claim 1, wherein said intermediate plate is made from stainless steel.

* * * * *